US008518463B2

(12) United States Patent
Gutknecht et al.

(10) Patent No.: US 8,518,463 B2
(45) Date of Patent: Aug. 27, 2013

(54) CREAM CHEESE PRODUCTS

(75) Inventors: Jon R. Gutknecht, Delray Beach, FL (US); John B. Ovitt, Franklin, VT (US)

(73) Assignee: Franklin Foods, Inc., Enosburg Falls, VT (US)

( * ) Notice: Subject to any disclaimer, the term of this patent is extended or adjusted under 35 U.S.C. 154(b) by 0 days.

(21) Appl. No.: 13/012,281

(22) Filed: Jan. 24, 2011

(65) Prior Publication Data

US 2011/0117242 A1    May 19, 2011

Related U.S. Application Data

(62) Division of application No. 11/454,756, filed on Jun. 16, 2006, now Pat. No. 7,897,185.

(60) Provisional application No. 60/691,911, filed on Jun. 17, 2005.

(51) Int. Cl.
A23C 9/12    (2006.01)

(52) U.S. Cl.
USPC ............... 426/36; 426/34; 426/39; 426/582

(58) Field of Classification Search
USPC ............ 426/34, 36, 39, 519, 522, 580, 582
See application file for complete search history.

(56) References Cited

U.S. PATENT DOCUMENTS

| | | |
|---|---|---|
| 2,387,276 A | 10/1945 | Link |
| 2,436,498 A | 2/1948 | Strezynski |
| 3,749,583 A | 7/1973 | Cox |
| 3,929,892 A | 12/1975 | Hynes |
| 4,110,476 A | 8/1978 | Rhodes |
| 4,194,011 A | 3/1980 | Invernizzi |
| 4,293,573 A | 10/1981 | Bradley |
| 4,341,801 A * | 7/1982 | Weissman ............ 426/40 |
| 4,397,878 A | 8/1983 | Koide |
| 4,410,549 A | 10/1983 | Baker |
| 4,434,184 A | 2/1984 | Kharrazi |
| 4,518,616 A | 5/1985 | Czulak |
| 4,534,982 A | 8/1985 | Yoshida |
| 4,560,560 A | 12/1985 | Narimatsu |
| 4,569,846 A | 2/1986 | Ohzeki |
| 4,678,673 A | 7/1987 | Marshall |
| 4,724,152 A | 2/1988 | Baker et al. |
| 4,732,769 A | 3/1988 | Sozzi |
| 4,749,584 A | 6/1988 | Wirchansky |
| 4,837,035 A | 6/1989 | Baker |
| 4,837,036 A | 6/1989 | Baker |
| 4,952,414 A | 8/1990 | Kaufman |
| 4,956,186 A | 9/1990 | Streiff |
| 4,968,512 A | 11/1990 | Kharrazi |
| 4,980,179 A | 12/1990 | Koenraads |
| 5,009,867 A | 4/1991 | Kratochvil |
| 5,079,024 A | 1/1992 | Crane |
| 5,143,742 A | 9/1992 | Maroudas |
| 5,165,945 A | 11/1992 | Yee |
| 5,180,604 A | 1/1993 | Crane |
| 5,252,352 A | 10/1993 | Banach |
| 5,356,639 A | 10/1994 | Jameson |
| 5,378,478 A | 1/1995 | Miller |
| 5,395,631 A | 3/1995 | Sweeney |
| 5,449,523 A | 9/1995 | Hansen |
| 5,470,593 A | 11/1995 | Meilinger |
| 5,520,948 A | 5/1996 | Kvamme |
| 5,580,592 A | 12/1996 | Nassauer |
| 5,676,984 A | 10/1997 | Bohanan |
| 5,679,396 A | 10/1997 | Finnocchiaro |
| 5,807,601 A | 9/1998 | Carpenter |
| 5,820,903 A | 10/1998 | Fleury |
| 5,846,592 A | 12/1998 | Alderliesten |
| 5,851,577 A | 12/1998 | Brenton |
| 5,882,704 A | 3/1999 | Yamaguchi |
| 5,916,608 A | 6/1999 | Lanting |
| 6,025,008 A | 2/2000 | Akahoshi |
| 6,036,979 A | 3/2000 | Hormann |
| 6,096,352 A | 8/2000 | Kijowski |
| 6,096,870 A | 8/2000 | Mozaffar |
| 6,136,351 A | 10/2000 | Nauth |
| 6,183,802 B1 | 2/2001 | Silva |
| 6,183,805 B1 | 2/2001 | Moran |
| 6,303,160 B1 | 10/2001 | Laye |

(Continued)

FOREIGN PATENT DOCUMENTS

DE    3314551 C1    11/1984
EP    0368492 A1    5/1990

(Continued)

OTHER PUBLICATIONS

Newlander, C.E., "The Babcock Test: Notes on its Use in Determining TM Percentage of Fat in Whole Milk, Skim-Milk, Buttermilk, Cream and Whey," Bulletin No. 2, Extension Series, Mar. 1916, pp. 1-11, Publisher: Michigan Agricultural College, Extension Division.
Tamime et al., "Yoghurt Science and Technology", Pergamon Press, Oxford, p. 250, Fig. 5.12 (1985).
Roberfroid, Marcel B., et al., "The Bifidogenic Nature of Chicory Insulin and its Hydrolysis Products", Journal of Nutrition, vol. 128, No. 1, pp. 11-19 (American Society for Nutritional Sciences, Jan. 1998.
Zubillaga, M., et al., "Effect of probiotics and functional foods and their use in different diseases", Nutrition Research, vol. 21, pp. 569-579 (Elsevier Science Inc. 2001).
U.S. Food & Drug Administration, Grade "A" Pasteurized Milk Ordinance, 2001 Revision, 152pp.
Waukesha Cherry-Burrell, Votator Scraped Surface Heat Exchangers, 2001, 12pp.
Danisco, "Distilled monogycerides" (2005), 2pp.
BASF Technical Bulletin, "Beta-carotene 15M Dispersion in Corn Oil" (2004), 1p.

(Continued)

Primary Examiner — Leslie Wong
(74) Attorney, Agent, or Firm — Jay M. Brown

(57) ABSTRACT

Technique for making a cream cheese product comprising steps of: providing a milkfat fluid comprising butterfat; pasteurizing the milkfat fluid; homogenizing the milkfat fluid; and culturing bacteria in the milkfat fluid; producing a cream cheese product comprising live probiotic bacteria cultures. Cream cheese product comprising: between about 10% by weight and about 55% by weight of total butterfat; and a live probiotic bacteria culture.

12 Claims, 2 Drawing Sheets

(56) References Cited

U.S. PATENT DOCUMENTS

| | | | |
|---|---|---|---|
| 6,365,205 B1 | 4/2002 | Wahlgren | |
| 6,406,736 B1 | 6/2002 | Han | |
| 6,416,797 B1 | 7/2002 | Han | |
| 6,419,974 B1 | 7/2002 | Silva | |
| 6,419,975 B1 | 7/2002 | Han | |
| 6,485,762 B1 | 11/2002 | Rizvi | |
| 6,544,567 B1 | 4/2003 | Davis | |
| 6,558,716 B1 | 5/2003 | Kent et al. | |
| 6,572,901 B2 | 6/2003 | Han | |
| 6,689,402 B1 | 2/2004 | Nauth | |
| 6,740,344 B2 | 5/2004 | Murphy | |
| 6,861,080 B2 | 3/2005 | Kent | |
| 6,982,100 B2 | 1/2006 | Swearingen | |
| 7,083,815 B2 | 8/2006 | Gutknecht | |
| 7,150,894 B2 | 12/2006 | Cha | |
| 7,250,183 B2 | 7/2007 | Lindstrom | |
| 7,258,886 B2 | 8/2007 | Brue | |
| 7,572,473 B2 | 8/2009 | Gutknecht | |
| 7,579,029 B2 | 8/2009 | Wolf-schoon | |
| 7,582,326 B2 | 9/2009 | Brown | |
| 7,585,537 B2 | 9/2009 | Merrill | |
| 7,687,095 B2 | 3/2010 | Ma | |
| 7,713,564 B2 | 5/2010 | Merrill | |
| 7,763,294 B2 | 7/2010 | Gutknecht | |
| 7,897,185 B1 * | 3/2011 | Gutknecht et al. | 426/36 |
| 7,998,519 B2 | 8/2011 | Gutknecht | |
| 2003/0031758 A1 | 2/2003 | Koss | |
| 2003/0219510 A1 | 11/2003 | Kent | |
| 2005/0064067 A1 | 3/2005 | Schmitt | |
| 2005/0180962 A1 * | 8/2005 | Raz et al. | 424/93.45 |
| 2006/0024412 A1 | 2/2006 | Cha | |
| 2006/0068075 A1 | 3/2006 | Fultz | |
| 2006/0141096 A1 | 6/2006 | Gutknecht | |
| 2006/0246180 A1 | 11/2006 | Galal | |
| 2007/0077332 A1 | 4/2007 | Moran | |
| 2008/0160133 A1 | 7/2008 | Brooks | |
| 2009/0041920 A1 | 2/2009 | Eibel | |
| 2009/0123601 A1 | 5/2009 | Wolf-schoon | |
| 2010/0092608 A1 | 4/2010 | Gutknecht | |
| 2010/0098820 A1 | 4/2010 | Imai | |
| 2010/0143537 A1 | 6/2010 | Solanes | |
| 2011/0268841 A1 | 11/2011 | Gutknecht | |

FOREIGN PATENT DOCUMENTS

| | | | |
|---|---|---|---|
| GB | 2290937 A | | 1/1996 |
| IT | 1178926 B2 | | 9/1987 |
| WO | 9637114 A1 | | 11/1996 |
| WO | 99/62348 | * | 12/1999 |
| WO | 9962348 A1 | | 12/1999 |

OTHER PUBLICATIONS

Cerning et al., "Isolation and Characterization of Exopolysaccharides from Slime-Forming Mesophilic Lactic Acid Bacteria,"J. Dairy Sci., vol. 75 (1992), pp. 692-699.

Kosin et al., "Microbial and Processing Criteria for Production of Probiotics: A Review," Mar. 2006, Food Technol. Biotechnol. vol. 44 No. 3, pp. 371-379.

Charteris et al., "Edible table (bio)spread containing potentially probiotic *Lactobacillus* and *Bifidobacterium* species," Int. J. Dairy Tech., Feb. 2002, vol. 55, No. 1, pp. 44-56.

Commonly-owned U.S. Appl. No. 11/453,941, filed Jun. 15, 2006; (32 pages).

Almecija et al., "A flux enhancing pretreatment for the ultrafiltration of acid whey," Desalination, vol. 246 (2009) pp. 364-369.

Westergaard, Vagn, "Milk Powder Technology—Evaporation and Spray Drying," Niro A/S, (2004), 337 pp.; published online at www.niro.com.

"Nutrients in Milk," downloaded on Jan. 11, 2011 from www.dairyforall.com; 2 pp.

"U.S. Whey Exports," downloaded on Feb. 22, 2011 from www.fas.usda.gov; (updated May 2, 2003); 4 pp.

"Utilization of Whey," downloaded on Jan. 11, 2011 from www.dairyforall.com; 1 p.

"Whey," downloaded on Jan. 11, 2011 from www.dairyforall.com; 2 pp.

"Whey Protein Concentrates," downloaded on Jan. 11, 2011 from www.dairyforall.com; 2 pp.

"Reference Manual for U.S. Whey and Lactose Products," U.S. Dairy Export Council; downloaded on Feb. 23, 2011 from www.usdec.org (publication date unknown); 226 pp.

Daschner, F. et al., "Optimization of the microwave determination of water in foods using principal component analysis," Instrumentation and Measurement Technology Conference 2000 (IMTC 2000; Proceedings of the 17th IEEE), May 1-4, 2000, vol. 1 pp. 12-16; [Abstract Only, 1 p.].

"GEA Niro Method No. A 9 b, Total Fat by Gerber/Teichert", revised Sep. 2005, published on-line at www.niro.com; 2 pp.

"Protein Determination: Protein Nitrogen Content of Milk—Kjeldahl Method (Direct Method)", Jun. 1991, published online by the United States Department of Agriculture at www.fmmaseattle.com; 11 pp.

Davis, J.G., "Yogurt Cheese," The Milk Industry, Apr. 1971, pp. 8-11.

"Composition of Different Species of Milk," downloaded on Dec. 20, 2011 from www.dairyforall.com; 1 p.

Supplementary European Search Report: cover sheet; "Documents considered to be relevant"; and "Annex." Published on Dec. 21, 2011 in counterpart European patent application No. 06772970.7 (3 pages).

Supplementary European Search Report: cover sheet; "Documents considered to be relevant"; and "Annex." Published on May 19, 2011 in European patent application No. 05853377.9 (3 pages).

International Search Report published on Aug. 21, 2006 in PCT/US05/44435 (8 pages).

Supplementary European Search Report: cover sheet; "Documents considered to be relevant"; and "Annex." Published on Aug. 7, 2009 in European patent application No. 07796426.0 (3 pages).

Commonly-owned U.S. Appl. No. 13/037,292, filed Feb. 28, 2011; (41 pages).

Commonly-owned U.S. Appl. No. 13/341,497, filed Dec. 30, 2011; (32 pages).

Commonly-owned U.S. Appl. No. 13/341,563, filed Dec. 30, 2011; (34 pages).

Commonly-owned U.S. Appl. No. 13/341,434, filed Dec. 30, 2011; (35 pages).

International Search Report published on Jun. 12, 2006 in PCT/US06/22888 (8 pages).

International Search Report published on Oct. 14, 2005 in PCT/US04/02538 (8 pages).

International Search Report published on Nov. 13, 2007 in PCT/US07/14749 (8 pages).

* cited by examiner

US 8,518,463 B2

CREAM CHEESE PRODUCTS

CROSS REFERENCE TO RELATED APPLICATIONS

This application claims priority to and is a divisional of U.S. application Ser. No. 11/454,756, filed Jun. 16, 2006, now U.S. Pat. No. 7,897,185, which claimed the benefit of priority to U.S. Provisional Application No. 60/691,911, filed Jun. 17, 2005, all of which are incorporated by reference into this application in their entireties.

BACKGROUND OF THE INVENTION

1. Field of the Invention

The present invention relates to the field of cream cheese products and methods of making the same.

2. Background of the Invention

Cream cheese and similar products are ubiquitous in modern diets. They generally have a smooth texture and a bland, unremarkable flavor. Spreadability makes cream cheese convenient to use, which is the primary basis for its choice by consumers over other firmer cheeses and the reason for its high volume consumption as a topping, for example on breads including bagels. In the classic method for making cream cheese, a pasteurized milkfat fluid such as cream, having a butterfat content generally within a range of between about 10% by weight and 52% by weight, is the primary raw material. This milkfat fluid is subjected to thorough digestion by lactic acid-producing bacteria, homogenized, and clotted by enzymes or direct acidification. The milkfat fluid is thus transformed into a solid phase containing a high concentration of fat that is referred to as the curd, and a liquid phase containing much of the nutritious protein from the milkfat fluid, referred to as the whey. The curd is then processed into the desired cream cheese product, and the whey is discarded. As a result, cream cheese typically has a bland, dull, virtually unnoticeable taste. The retention of liquid whey in the curd is a problem in itself, as the liquid gradually leaks out of the curd in an unappealing and ongoing separation that is called synersis. In addition, large scale cream cheese production generates corresponding quantities of often unusable whey, which thus becomes a waste expense and environmental detraction unless some other use can be found for it.

Accordingly it would be highly desirable to provide a process for making an improved cream cheese product from a milkfat fluid, having the consistency of high-milkfat cream cheese including a mouth-pleasing texture and convenient spreadability, desirably having the robust flavor of whey retained from the milkfat fluid. The resulting cream cheese product would be a welcome substitute for its faintly-tasting progenitors while simultaneously improving cheese production economics and protecting the environment.

SUMMARY

In one implementation, a process is provided for making a cream cheese product comprising steps of: providing a milkfat fluid comprising butterfat; pasteurizing said milkfat fluid; homogenizing said milkfat fluid; and culturing bacteria in said milkfat fluid; producing a cream cheese product comprising live probiotic bacteria cultures.

In another implementation, a cream cheese product is provided, comprising: between about 10% by weight and about 55% by weight of total butterfat; and a live probiotic bacteria culture.

A more complete understanding of the present invention, as well as other features and advantages of the present invention, will be apparent from the following detailed description and the accompanying drawings.

DETAILED DESCRIPTION

Figure 1:
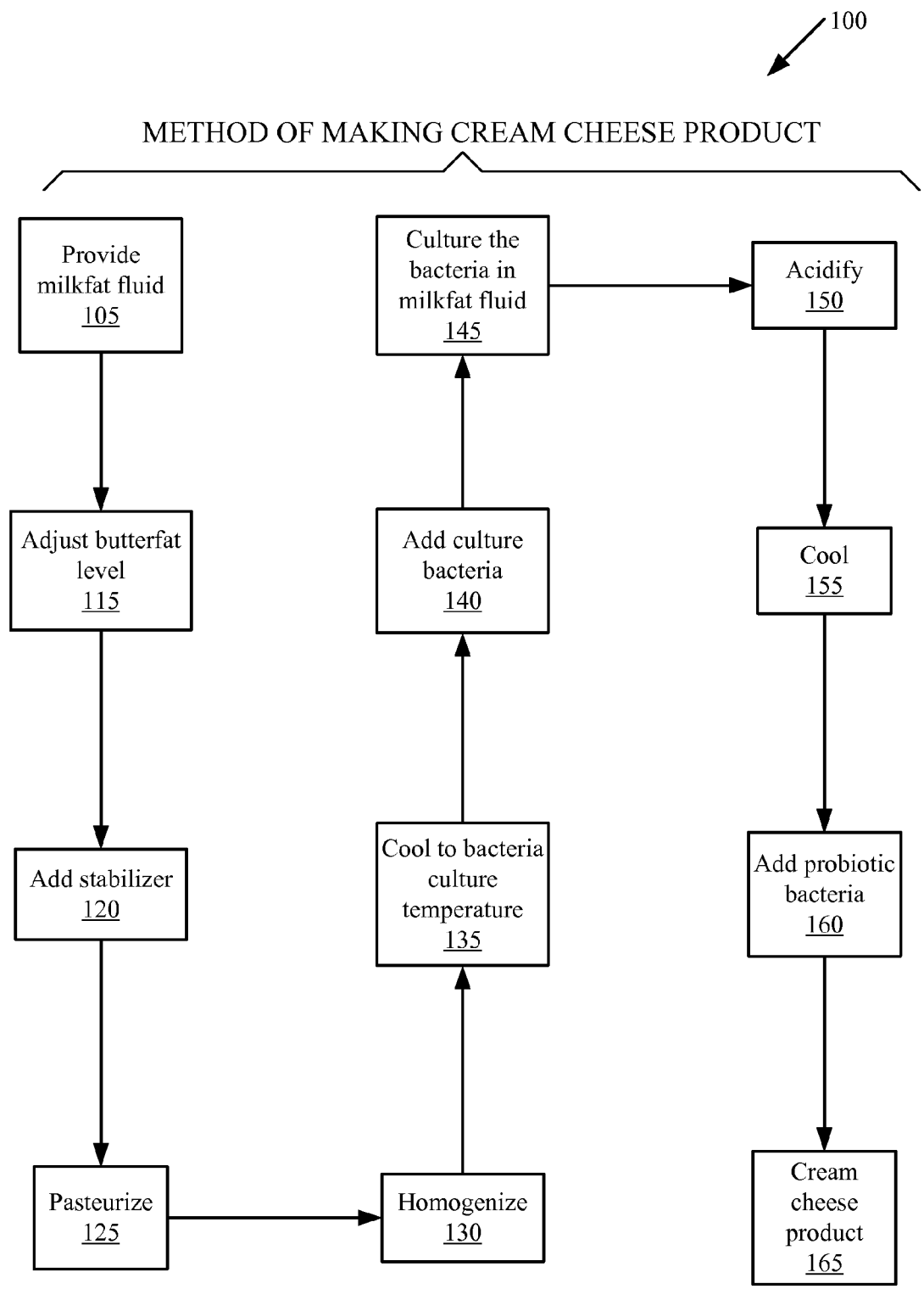
FIG. 1 is a flow chart of an exemplary process for making a cream cheese product according to the present invention.

Referring to FIG. 1, a flow chart of an exemplary process 100 is shown for making a cream cheese product 165. For purposes of this disclosure, the term "cream cheese product" denotes a product resulting from the digestion of a milkfat fluid by culture bacteria, said cream cheese product comprising live probiotic culture bacteria. For purposes of this disclosure, the term "culture bacteria" denotes a bacteria strain that is selected and added to milkfat fluid in order to at least partially digest the milkfat fluid and form the cream cheese product, and/or to constitute a live, probiotic ingredient in the cream cheese product. Cream cheese itself generally has a milkfat content of at least about 33% by weight. Neufchatel cheese generally has a milkfat content within a range of between about 17% and about 33% by weight. Light cream cheese generally has a milkfat content within a range of between about 10% and about 17% by weight. Cream cheese, Neufchatel cheese, and light cream cheese are all within the scope of the definition herein of the term "cream cheese product".

Process 100 begins with provision of a milkfat fluid at step 105. By milkfat is meant a composition comprising the fatty components of edible milk, for example, cow milk. Such fatty components, commonly referred to collectively as butterfat, can include, for example, triacylglycerols, diglycerides, monoacylglycerols, and other lipids. By fluid is meant a liquefied composition comprising milkfat, which can either be directly derived from milk, or reconstituted by hydrating a dehydrated milk product. For example, the milkfat fluid can be cream. The milkfat fluid can be formed from a mixture of sources, including, for example, whole milk, cream, skim milk, and dry milk. Ambient air contains harmful bacteria that can degrade the milkfat fluid 105. Accordingly, exposure of the milkfat fluid to air is avoided.

In one implementation, the butterfat content of the milkfat fluid is standardized at step 115 to a desired level. The butterfat content of the final cream cheese product can then be projected. For example, cream cheese is defined to include a minimum butterfat content of 33% by weight. Given the variable nature of raw milk, for example, standardization of the butterfat content in a given batch of milkfat fluid may generally be desirable in furtherance of process stability and production of a uniform product. In one implementation, the milkfat fluid has a butterfat content within a range of between about 10% and about 52% by weight. In a further implementation, the milkfat fluid has a butterfat content within a range of between about 30% and about 52% by weight. In another implementation, the milkfat fluid has a butterfat content within a range of between about 33% and about 50% by weight. In a further implementation, the milkfat fluid has a butterfat content within a range of between about 39% and about 50% by weight. In another implementation, the milkfat fluid has a butterfat content within a range of between about 40% and about 44% by weight. In yet another implementation, the milkfat fluid has a butterfat content within a range of between about 17% and about 33% by weight. In general, the texture and mouth feel of cream cheese products improves with higher butterfat content. Higher butterfat levels also provide better tolerance of the milkfat fluid to subsequent processing steps, such as agitation shear that can degrade butterfat and protein molecules.

In an additional implementation, the milkfat fluid has a water content within a range of between about 50% and about 60% by weight. For example, heavy cream may have a butterfat content of about 37% by weight, a protein content of about 2% by weight, and a water content of about 58% by weight, with the balance made up by other milk solids. In a further implementation, the final cream cheese product has a water content within a range of between about 50% by weight and about 55% by weight. Butterfat is an essential ingredient in cheese, as the butterfat is coagulated together with proteins and other elements into a curd and further processed to produce the cheese. The term "cheese" is broadly defined for purposes of this disclosure as a milkfat fluid that has been at least partially digested by culture bacteria.

The initial butterfat level present in a given batch of milkfat fluid can be measured, for example, using a standard Babcock test. For background, see Baldwin, R. J., "The Babcock Test," Michigan Agricultural College, Extension Division, Bulletin No. 2, Extension Series, March 1916, pp. 1-11; the entirety of which is herein incorporated by reference. Where the initial butterfat level present in a given batch of milkfat fluid is too high, adjustment can be accomplished by adding a nonfat material such as skim milk. Addition of water is generally ineffective since the water content of the curd directly affects the cream cheese product viscosity, and the feasibility of adding water alone to adjust the butterfat level in the final cream cheese product is accordingly limited. In one implementation, the butterfat content of a batch of milkfat fluid is downwardly adjusted by addition of an appropriate amount of nonfat dry milk together with adequate water to rehydrate the nonfat dry milk, which has the advantage of not contributing excess water to the batch. In the event that the initial butterfat level present in a given batch of milkfat fluid needs to be upwardly adjusted, this can be accomplished by addition of a material containing a higher concentration of butterfat, such as, for example, cream.

According to a further implementation, the relative milkfat fluid concentrations of butterfat, milkfat protein and water are controlled. As explained above, the butterfat content of the final cream cheese product is selected as desired. For example, cream cheese includes at least about 33% by weight of butterfat. Regarding protein, higher concentrations are generally desirable for nutritional considerations. Water is a secondary ingredient that is necessary to a reasonable degree to facilitate processing, as well as to provide a desirable texture in the product. However, excessive water will not be retained in the curd and hence becomes a processing hindrance and expense, and a disposal issue. In one implementation, the milkfat fluid comprises about 10% to about 52% butterfat, about 4% milk protein, and about 51.5% to about 36% water, with the balance constituted by other milk solids.

Referring to FIG. 1, in one implementation a stabilizer is added to the milkfat fluid at step 120. Stabilizers thicken the milkfat fluid by binding water, which may contribute to retention of whey in the milkfat fluid during subsequent processing. The stabilizer may be selected from, for example, gums, salts, emulsifiers, and their mixtures. Suitable gums include, for example, locust bean gum, xanthan gum, guar gum, gum arabic, and carageenan. Suitable salts include, for example, sodium chloride and potassium chloride. These salts can also be added in suitable concentrations, if desired, as flavoring for the cream cheese product. Suitable emulsifiers include, for example, sodium citrate, potassium citrate, mono-, di-, and tri-sodium phosphate, sodium aluminum phosphate, sodium tripolyphosphate, sodium hexametaphosphate, dipotassium phosphate, and sodium acid pyrophosphate. In one implementation, the stabilizer is K6B493, a milled, dry product that is commercially available from CP Kelco US, Inc., 1313 North Market Street, Wilmington, Del. 19894-0001. Gum arabic is commercially available from TIC Gums Inc., Belcamp, Md. A stabilizer blend comprising xanthan gum, locust bean gum and guar gum is also commercially available from TIC Gums Inc. Gum-based stabilizers typically contain sodium, which should be taken into account in order to avoid excessive sodium concentrations in the final cream cheese product. For this reason, use of salts as stabilizers is also not preferred.

In one implementation, an amount of a stabilizer effective to cause a moderate thickening of the milkfat fluid is added. For example, a stabilizer may be added in an amount constituting between about 0.25% by weight to about 0.45% by weight of the cream cheese product. In another implementation, a stabilizer may be added in an amount constituting between about 0.3% by weight to about 0.4% by weight of the cream cheese product. As the butterfat content of the chosen milkfat fluid is reduced, the proportion of stabilizer used desirably is increased.

In one implementation, the milkfat fluid is pasteurized at step 125. Prior to this step, the milkfat fluid typically carries the wild bacteria load normally present in raw milk products. Pasteurization of the milkfat fluid is required at some point in order to kill these undesirable bacteria, as well as other undesired microbes, to the extent reasonably feasible. Pasteurization needs to be completed in advance of bacteria culture steps 140-145 discussed below, or the wild bacteria in the raw milkfat fluid will typically digest and thereby spoil the product. Where a source of pre-pasteurized milkfat fluid is employed, further pasteurization at this point may be unnecessary.

Pasteurization causes irreversible heat-induced denaturation and deactivation of bacteria. Effective pasteurization is a function of both time and temperature; pasteurization can be completed at higher temperatures in correspondingly shorter times. In one implementation, pasteurization of the milkfat fluid in step 125 is carried out in a vat process at a temperature of about 150° Fahrenheit ("F") for about 30 minutes; or about 165° F. for about 15 minutes; or if a more strenuous process is desired, about 170° F. for about 30 minutes. Other effective time and temperature treatment parameters are known; and substitution of high surface area contact methods for the vat process can permit shorter effective treatment times. High temperature short time pasteurization for example, in which the milkfat fluid is pumped through an in-line tube within a temperature-controlled shell, can be used. Milkfat fluids having relatively high butterfat content generally require more heat exposure than low butterfat fluids in order to obtain effective pasteurization. Further background information on pasteurization of milk is provided in the Grade "A" Pasteurized Milk Ordinance published on May 15, 2002 by the U.S. Food & Drug Administration, particularly at pages 62 and 63; the entirety of which is hereby incorporated herein by reference.

Agitation is desirably provided and initiated prior to the heating process during pasteurization to facilitate even heating throughout the milkfat fluid and to avoid localized over-heating. The force applied by the agitation should not be so strong as to substantially shear and thus degrade the butterfat and proteins in the milkfat fluid. Desirably, pasteurization is carried out in a tank equipped with a heater and agitator. Any suitable vessel can be used, such as, for example, a Groen kettle.

At step 130, the milkfat fluid is homogenized by subjecting it to an elevated pressure, desirably at an elevated temperature, for a suitable period of time. Application of such an elevated pressure breaks down the butterfat globules in the milkfat fluid, resulting in substantially increased product uniformity. In general, homogenization is carried out at an elevated pressure, which can be applied to the milkfat fluid by any suitable means, such as, for example, hydraulic or mechanical force. In one implementation, the milkfat fluid is compressed to the selected pressure and then passed through an orifice to quickly reduce such pressure. Homogenization is desirably carried out at a relatively high temperature, because the resulting fluidity of the milkfat fluid increases the efficiency of the homogenization step. In one implementation, the homogenization step 130 is carried out at a controlled temperature within a range of between about 155° F. and about 165° F. Lower temperatures can be used if desired. Homogenization can be carried out, for example, in a Gaulin homogenizer.

In one implementation, the homogenization pressure is within a range of between about 2,000 pounds per square inch (PSI) to about 4,000 PSI. In another implementation, the homogenization pressure is within a range of between about 2,500 PSI to about 3,200 PSI. As the applied pressure increases, the resulting viscosity of the final cream cheese product accordingly increases. Hence, the pressure to be applied is desirably chosen to yield a final product of the desired consistency.

In one implementation, a homogenizer is employed having a homogenization chamber, an inlet chamber, and an outlet chamber. The inlet chamber is a vessel suitable for staging a supply of the milkfat fluid, on a continuous or batch basis, for introduction into the homogenization chamber. The homogenization chamber is a vessel having controllable orifices for input and output of the milkfat fluid, and is reinforced to withstand containment of an elevated pressure suitable for homogenization. The outlet chamber is a vessel suitable for staging a supply of the homogenized milkfat fluid, on a continuous or batch basis, for further processing. The milkfat fluid passes through the inlet chamber before being pumped into the homogenization chamber. Following homogenization, the milkfat fluid is expelled from the homogenization chamber into the outlet chamber. These flows are typically carried out on a continuous basis, although a batch process can also be done. The pressure within the homogenization chamber is adjusted to the chosen homogenization pressure and maintained there during homogenization. The pressure in the inlet chamber may be, for example, within a range of between about 20 PSI and about 40 PSI, generated by pumping of the milkfat fluid into the inlet chamber. Similarly, the pressure in the outlet chamber may be, for example, within a range of between about 20 PSI and about 40 PSI, generated by expelling the milkfat fluid from the homogenization chamber and then containing it in the outlet chamber. The milkfat fluid can undergo a pressure drop upon passing from the homogenization chamber to the outlet chamber, by ejection through a hole, such as for example a hole having a diameter of about a centimeter. The pressures within the inlet chamber, outlet chamber and homogenization chamber are carefully controlled so that air is not entrained into the homogenization chamber. Such air can cause cavitation, which can degrade the product and potentially lead to an explosive release of the homogenization pressure.

The temperature of the milkfat fluid is adjusted at step 135 to a bacteria culture temperature. In one implementation, culture bacteria generally suitable for the production of a cream cheese are used, and the temperature of the milkfat fluid is adjusted, before bacteria addition in step 140, to a temperature within a range of between about 65° F. and about 92° F. In an additional implementation, the temperature of the milkfat fluid is adjusted to within a range of between about 70° F. and about 85° F. In another implementation, the temperature of the milkfat fluid is adjusted to about 82° F.

In a further implementation, culture bacteria generally suitable for the production of yogurt, or another probiotic culture bacteria, are used and the temperature of the milkfat fluid is adjusted, before bacteria addition in step 140, to a temperature within a range of between about 95° F. and about 110° F. The term "probiotic" means that the subject bacteria, in live and active form, are beneficial to the consumer when ingested. For example, certain yogurt culture bacteria including *Lactobacillus delbrueckii* subspecies *bulgaricus*, *Streptococcus thermophilus*, *Lactobacillus acidophilus*, *Bifidobacterium*, and *Lactobacillus paracasei* subspecies *casei*, are retained in the digestive tract where they aid in food digestion. In an additional implementation, the temperature of the milkfat fluid is adjusted to within a range of between about 100° F. and about 108° F. In yet a further implementation, the temperature of the milkfat fluid is adjusted to about 106° F.

In one implementation, culture bacteria are added to the milkfat fluid at step 140, and then cultured at step 145. The purpose of these steps is to generate robust culture-induced flavor in the milkfat fluid. Milk contains lactose sugars that can be digested by selected bacteria, producing lactic acid, glucose and galactose as metabolites. Hence, the culture bacteria generally are selected from among those that can digest lactose. Desirably, a strain of mesophilic bacteria suitable for culturing cream cheese is used. Such bacteria strains are typically chosen to produce diacetyl flavor. Bacteria strains may require ongoing rotational use, to prevent background bacteriophage populations from becoming resistant to a particular strain of bacteria, which can result in shutdown of the culture process and contamination of the product in production. For example, the culture bacteria may be selected from varying combinations of strains, desirably rotated on an ongoing basis, of (1) lactic acid-producing *Lactococcus lactis* subspecies *lactis* or subspecies *cremoris*; and (2) diacetyl flavor-producing *Lactococcus lactis* subspecies *diacetylactis* or *Leuconostoc* strains. Suitable bacteria strains are commercially available under the trade name pHage Control™ from Chr. Hansen, Bøge Allé 10-12, DK-2970 Hørsholm, Denmark. Grades 604 and 608 are particularly effective. These particular bacteria strain blends can be used continuously without rotation, provided that proper sanitation is maintained. Further suitable bacteria strains are commercially available under the trade names Flay Direct™ and DG™ Cultures from Degussa BioActives, 620 Progress Avenue, P.O. Box 1609, Waukesha, Wis. 53187-1609.

In another implementation, other bacteria strains beyond those discussed above, providing health benefits to the consumer, can be used. Bacteria strains recognized as probiotics, for example, can be used. Desirably, a thermophilic bacteria strain suitable for producing yogurt, for example, is used. Among the additional bacteria strains that can be employed in step 140 are *Lactobacillus delbrueckii* subspecies *bulgaricus*, *Streptococcus thermophilus*, *Lactobacillus acidophilus*, *Bifidobacterium*, and *Lactobacillus paracasei* subspecies *casei*.

Suitable culture bacteria strains are commercially available, for example, under the trade name Yo-Fast® from Chr. Hansen, Bøge Allé 10-12, DK-2970 Hørsholm, Denmark. In one implementation, F-DVS YoFast®-10 is used, which contains blended strains of *Streptococcus thermophilus, Lactobacillus delbrueckii* subspecies *bulgaricus, Lactobacillus acidophilus, Bifidobacterium*, and *Lactobacillus paracasei* subspecies *casei*. In another implementation, DVS YoFast®-2211 is used. In a further implementation, culture bacteria comprising *Lactobacillus acidophilus, Bifidobacterium*, and *L. casei* is used. For example, Yo-Fast® 20 cultures comprise mixtures of *Lactobacillus acidophilus, Bifidobacterium*, and *L. casei*. Such culture bacteria can develop a very mild flavor and have high texturing properties, making possible the reduction or elimination of stabilizers and additives that may otherwise be needed for increasing the product viscosity. These culture bacteria also lend a desirable mouth feel and creaminess to low-fat products. Further suitable bacteria strains are commercially available under the trade names Ultra-Gro® and Sbifidus® from Degussa BioActives, 620 Progress Avenue, P.O. Box 1609, Waukesha, Wis. 53187-1609.

Once a culture bacteria strain or strain mixture is selected, an amount is added to a given batch of milkfat fluid that is effective to propagate live cultures throughout the batch in a reasonable time at the chosen culture temperature. For example, 500 grams of bacteria may be effective to inoculate up to 7,500 pounds of milkfat fluid using an inoculation proportion of about 0.015%. If desired, an inoculation proportion within the range of between about 0.013% and about 0.026%, for example, may be used. In general, greater proportional additions of culture bacteria to a milkfat fluid batch will lead to somewhat reduced processing time, but at the expense of increased costs for the bacteria.

In one implementation, the milkfat fluid is agitated following the addition of the culture bacteria, since the culture bacteria are typically added in a small proportion compared with the milkfat fluid, and hence desirably are dispersed so that they can act throughout the milkfat fluid. Agitation can if desired begin prior to addition of the culture bacteria, and can if desired be continued after dispersion of the culture bacteria. The shear force applied by the agitation should be sufficient to disperse the culture bacteria in a reasonable time, but not so strong as to substantially shear and thus degrade the culture bacteria, or the butterfat and proteins in the milkfat fluid. In one implementation, moderate agitation of the milkfat fluid containing the culture bacteria is continued for between about 10 minutes and about 25 minutes. In another implementation, moderate agitation is continued for about 15 minutes.

In step 145, the bacteria added at step 140 are cultured in the milkfat fluid. The necessary duration of such bacteria culturing depends on the type of bacteria used, the level of bacteria activity, the selected culture temperature, the initial bacteria concentration, and the composition of the milkfat fluid. The bacteria digest lactose sugars in the milkfat fluid. Higher culture temperatures and initial bacteria concentrations generally shorten the culture time needed. The temperature employed, however, must be within a range tolerable to the survival and growth of the selected culture bacteria. In one implementation, the milkfat fluid is held at a suitable temperature for cultures of the selected bacteria to develop for a sufficient time so that there is visible curd formation throughout the milkfat fluid, resulting in a substantial thickening.

In one implementation, culture bacteria suitable for the production of a cream cheese product are employed, and the milkfat fluid is held at a temperature within a range of between about 65° F. and about 92° F. In another implementation, the milkfat fluid is held at a temperature within a range of between about 70° F. and about 85° F. In an additional implementation, the milkfat fluid is held at a temperature of about 82° F. In one implementation, the milkfat fluid is cultured with such selected bacteria for between about 14 hours and about 16 hours. In another implementation, the milkfat fluid is cultured with such selected bacteria at a temperature of about 82° F. for about 14 hours.

In another implementation, culture bacteria suitable for preparation of a product comprising live and active probiotic bacteria cultures, such as thermophilic yogurt culture bacteria, is employed, and the milkfat fluid is held at a temperature within a range of between about 95° F. and about 112° F. In another implementation, the milkfat fluid is held at a temperature within a range of between about 100° F. and about 110° F. In a further implementation, the milkfat fluid is held at a temperature within a range of between about 106° F. and about 110° F. In an additional implementation, the milkfat fluid is held at a temperature of about 108° F. In one implementation, the milkfat fluid is cultured with such selected bacteria for between about 4 hours and about 8 hours. In another implementation, the milkfat fluid is cultured with such selected bacteria at a temperature of about 108° F. for about 6 hours.

Lactic acid is formed as a byproduct of metabolism of lactose by the bacteria in step 145. Hence, the measured pH of the milkfat fluid, which gradually decreases with lactic acid buildup, is an indication of the progress of the bacteria culture. Further, when the pH of the milkfat fluid reaches about 4.4, the level of bacterial activity begins to markedly decrease. In one implementation, the bacteria culture step 145 is continued until the pH of the milkfat fluid is within a range of about 5.0 to about 4.1. In another implementation, the bacteria culture step 145 is continued until the pH of the milkfat fluid is within a final target pH range of about 4.6 to about 4.4; and more desirably about 4.5. In one implementation, the bacteria culture step 145 is continued until the pH of the milkfat fluid reaches a target pH for the finished cream cheese product 165. As the pH of the milkfat fluid approaches this target, the milkfat fluid viscosity increases and the bacterial activity slows down. Hence, in one implementation, the milkfat fluid pH is monitored over time during step 145, and additional culture bacteria are added during step 145 if desired, to reinvigorate the bacteria culture process. In another implementation, if the target pH is not reached after a desired bacteria culture time period, then the culture bacteria concentration to be employed in subsequent practice of the process 100 is adjusted upward.

In one implementation, the milkfat fluid is acidified at step 150. Step 150 may be unnecessary, for example if the desired target pH for the cream cheese product can be reached in bacteria culture step 145. Desirably, such acidification is continued, if carried out at all, until a target pH for the finished cream cheese product 165 is reached. Desirably, acidification is carried out promptly following bacteria culture of the milkfat fluid at step 145. The optimum temperature zone for rapid bacterial growth is generally within a range of between about 75° F. and about 115° F. Accordingly, the milkfat fluid and the resulting cream cheese product are desirably exposed to temperatures within this range for as short a time period as reasonably possible in order to minimize undesirable and excessive bacterial activity and spoilage in the product. Acidification can be carried out, for example, in a set tank internally equipped with a scraped surface agitator to ensure rapid and thorough mixing of added acid with the milkfat fluid. Agitation desirably is discontinued upon reaching the desired product pH, in order to avoid excessive shearing and possible resulting breakdown of the viscosity of the cream cheese product. Acidification can generally be carried out at an elevated temperature, provided that the temperature is not high enough to kill any live bacteria cultures remaining in the milkfat fluid from steps 140-145. For example, acidification can be carried out at a temperature within the ranges discussed in connection with step 135, depending on the type of bacteria culture used, such as thermophilic or mesophilic. If desired, acidification can be carried out at a lower temperature, although the milkfat fluid viscosity increases as the temperature is reduced, and feasibility of mixing the acidification agent into the milkfat fluid is also important. In a further implementation, the temperature of the milkfat fluid is reduced to a temperature of less than about 75° F. during or after acidification in step 150. Carrying out acidification becomes gradually more difficult as the temperature of the milkfat fluid is lowered, due to the steadily increasing viscosity. Furthermore, acidification at a temperature below about 60° F. may result in a lumpy cream cheese product texture. Cooling can be effected, for example, using jacketed tanks containing a glycol refrigerant maintained at a desired temperature to withdraw heat from the milkfat fluid in the tank.

In one implementation, the pH of the milkfat fluid is adjusted to within a range of about 5.0 to about 4.1, more desirably about 4.6 to about 4.4, and still more desirably about 4.5. In another implementation, the pH of the milkfat fluid for producing a plain cream cheese product, meaning one that does not contain or contains minimal concentrations of fruits, vegetables, nuts, flavorings, condiments or other food additives, is adjusted to within a range of between about 4.40 and about 4.50. In a further implementation, the pH of the milkfat fluid for a flavored cream cheese product, meaning one that does contain a significant concentration of fruits, vegetables, nuts, flavorings, condiments or other food additives, is adjusted to within a range of between about 4.38 and about 4.48. At a pH of the milkfat fluid lower than about 4.40 or 4.38 for plain or flavored cream cheese products respectively, the taste begins to become sharp, and at a pH of about 4.2 or lower is generally too tart. At a pH of the milkfat fluid above about 4.50 or 4.48 for plain or flavored cream cheese products respectively, the product viscosity begins to undesirably decline, potentially resulting in poor body or runniness.

In one implementation, the pH adjustment is carried out by adding an appropriate amount of an edible acid to the milkfat fluid. Edible acids include, for example, lactic acid, phosphoric acid, acetic acid, citric acid, and mixtures. For example, a suitable aqueous mixture of edible acids having a pH within a range of between about 0.08 and about 1.4 is available under the trade name Stabilac® 12 Natural from the Sensient Technologies Corporation, 777 East Wisconsin Avenue, Milwaukee, Wis. 53202-5304. Similar edible acid mixtures are also available from Degussa Corporation, 379 Interpace Parkway, P.O. Box 677, Parsippany, N.J. 07054-0677. In another implementation, the edible acid is lactic acid, being a metabolite naturally produced by lactose-consuming bacteria.

Bacteria present in the final product become substantially dormant at a pH substantially below about 4.38. Hence, acidification substantially slows down bacteria further propagation in the product, extending its shelf life. However, the desirable culture bacteria are not killed by this acidification process, and thus can still provide the health benefits of live and active bacteria cultures to the consumer. The edible acid present in the final cream cheese product also serves to provide a good-tasting bite to the flavor. At a pH of less than about 4.2, the product not only becomes too tart but may also start to soften, reducing the product viscosity.

In an alternative embodiment, a coagulating enzyme can be substituted for or used in conjunction with direct acid addition. Coagulating enzymes cause the casein protein in milk to form a gel. However, the action of coagulating enzymes generally requires much more time to completion than direct acidification, meanwhile allowing far more culture bacteria activity to occur and delaying the completion of acidification. The enzyme coagulation process is also accompanied by syneresis and the resulting loss of albumin protein from the gelled curd. Hence, enzyme coagulation generally results in an inferior cream cheese product having a reduced thickness and protein content. Enzymatic coagulation typically takes a long time, 12 hours for example. In general, any suitable coagulating enzyme of animal-, plant-, microbe, or other origin can be used. In one embodiment, the coagulant enzyme is chymosin, also referred to as rennin, which is the active component of rennet. Rennet is purified from calf stomachs. Chymosin breaks down casein protein to paracasein. Paracasein then combines with calcium to form calcium paracaseinate, which precipitates and starts formation of a solid mass. Milkfat and water become incorporated into the mass, forming curds. One part rennin can coagulate about 10,000 to about 15,000 parts milkfat fluid. Alternatively, pepsin, which is purified from the stomachs of grown calves, heifers, or pigs, can be used.

In one implementation, following completion of acidification step 150 the temperature of the finished cream cheese product is reduced at step 155 to a suitable refrigeration temperature, such as, for example, about 34° F. to about 38° F.

If desired, a suitable preservative can be added to the cream cheese product to retard bacteria, yeast and mold growth. For example, potassium sorbate, sodium benzoate, sorbic acid, ascorbic acid or nisin can be added. Nisin, for example, is a protein expressed by *Lactococcus lactis*. Further, if desired, flavorings, condiments and the like can be added. Adjuvants that are vulnerable to attack by the live bacteria are desirably added after reducing the temperature of the cream cheese product below about 75° F., and may need to be made resistant to such bacteria.

In one implementation, live probiotic culture bacteria are added to the cream cheese product in step 160 following completion of bacteria culture step 145 and desirably following completion of acidification in step 150; and provided that the temperature of the cream cheese product is low enough at and following such addition to avoid killing or unduly shocking the live culture bacteria. Step 160 can be carried out in the same manner as discussed above in connection with step 140. However, in step 160, the bacteria employed generally comprise live probiotic bacteria, although other bacteria among the strains discussed above in connection with step 140 can also be included. Such probiotic bacteria reinforce the health-related benefits of live and active culture bacteria in the cream cheese product, as earlier discussed. The desirability of such live probiotic culture bacteria addition and the concentration of such bacteria to be added to a given cream cheese product can be determined by carrying out a bacteria activity test. For example a Man, Rogosa and Sharpe ("MRS") broth test can be carried out.

FIG. 1 shows an implementation of an order of steps that can be carried out. Other orders of steps can be used. Pasteurization step 125 destroys the wild bacteria typically present in raw milkfat fluid such as whole milk or cream. If a pre-pasteurized milkfat source is used, then further pasteurization may be unnecessary. If pasteurization step 125 is to be carried out, then desirably any further ingredients are combined with the milkfat fluid before carrying out pasteurization step 125, so that contamination of the milkfat fluid by harmful wild bacteria is avoided. Hence, butterfat adjustment step 115 and stabilizer addition step 120 are both desirably carried out, if at all, prior to carrying out pasteurization step 125. Butterfat adjustment step 115 and stabilizer addition step 120 can be carried out in either order as desired. Homogenization step 130 is desirably carried out following, and desirably immediately following, pasteurization step 125. The elevated temperatures necessary during pasteurization step 125 are beneficial in carrying out homogenization step 130, as the viscosity of the milkfat fluid, and its resistance to homogenization, are reduced by the elevated temperatures. Homogenization is desirably carried out after combining all other ingredients to ensure their thorough mixing during step 130. However, homogenization is desirably carried out before bacteria culture steps 140 and 145 so that the culture bacteria are not damaged or killed during such homogenization. Acidification step 150 often causes a substantial thickening of the milkfat fluid and other ingredients. Desirably, acidification step 150 is carried out, if at all, following homogenization step 130, so that such thickening does not increase the difficulty of homogenizing the ingredients. Addition of live and active probiotic bacteria in step 160 desirably is carried out as a post-treatment following all of the foregoing steps, so that such probiotic bacteria are not damaged or killed during the other process steps.

The cream cheese product made according to the process of the present invention generally has the appearance, consistency, and texture of cream cheese. In addition, this product desirably includes retained whey from the milkfat fluid, which dramatically amplifies the flavor of the product, giving it a greatly superior and robust taste. Retention of the whey in this manner adds natural flavor without subjecting the product to large proportions of adulterating additives or heavy extra processing steps, and eliminates the pollution and economic loss resulting from whey separation in conventional cream cheese production. Further, the cream cheese product comprises live and active probiotic culture bacteria, which provide health benefits to the consumer. In one implementation, the cream cheese product comprises between about 10% and about 55% butterfat. In a further implementation, the cream cheese product comprises between about 33% and about 40% butterfat. In another implementation, the cream cheese product comprises between about 17% and about 33% butterfat. In a further implementation, the cream cheese product comprises between about 10% and about 17% butterfat. In yet another embodiment according to the present invention, the cream cheese product further comprises between about 2% by weight and about 10% by weight of milk protein, more preferably between about 3% by weight and about 7% by weight of milk protein, and still more preferably about 4% by weight of milk protein. In another implementation, the cream cheese product comprises between about 0.05% and about 0.09% by weight of cholesterol; between about 0.2% by weight and 0.4% by weight of sodium; and between about 58% by weight and 63% by weight of water.

In one implementation, inulin is added to the cream cheese product. Inulin is a polysaccharide that is naturally found in many plants. Inulin has a mildly sweet taste and is filling like starchy foods, but is not normally absorbed in human metabolism and therefore does not affect the sugar cycle. Inulin reduces the body's need to produce insulin, helping to restore normal insulin levels. Inulin also is a probiotic that extends the viability of the live and active bacteria in the digestive tract of the consumer, so that their beneficial effects in the body are increased. Inulin may, however, be implicated in food allergies, and can potentially induce anaphylactic shock in some people. Other non-digestible oligosaccharides and oligosaccharides resistant to metabolism, collectively referred to herein as "digestion-resistant polysaccharides", such as lactulose and lactitol, can also be used.

Various highly processed dairy derivatives have the potential for use in modifying the flavor and texture of the cream cheese products. These derivatives include, for example, milk protein concentrate, whole milk protein, whey protein concentrate, casein, Baker's cheese, yogurt powder and dry cottage cheese curd. Milk protein concentrate, for example, is produced by ultrafiltration of milk. Such materials can be added to the cream cheese product, or introduced during preparation of the product. However, their use is not preferred, and can by practice according to the present invention be minimized. Furthermore, addition of such agents generally is a poor substitute for the retention of whey from the milkfat fluid, as can be achieved in accordance with the present invention.

Syneresis leads to an unattractive and wasteful phase separation between curds and whey when milk is directly coagulated. In one embodiment according to the present invention, the cream cheese product exhibits substantially no syneresis, or less than about 1% syneresis by weight, after 15 hours at a temperature within a range of between about 74° F. to about 75° F.

The texture and consistency of the cream cheese product made in accordance with one implementation is the same as that of ordinary cream cheese. For example, the cream cheese product may have a viscosity within a range of between about 2,000,000 centipoises and about 5,000,000 centipoises at a temperature of about 74° F. In another implementation, the cream cheese product has a viscosity within a range of between about 3,000,000 centipoises and about 4,000,000 centipoises at a temperature of about 74° F. Viscosity is conventionally measured, using, for example, a Brookfield viscometer. Viscosities as low as about 1,500,000 centipoises may also be acceptable.

Figure 2:
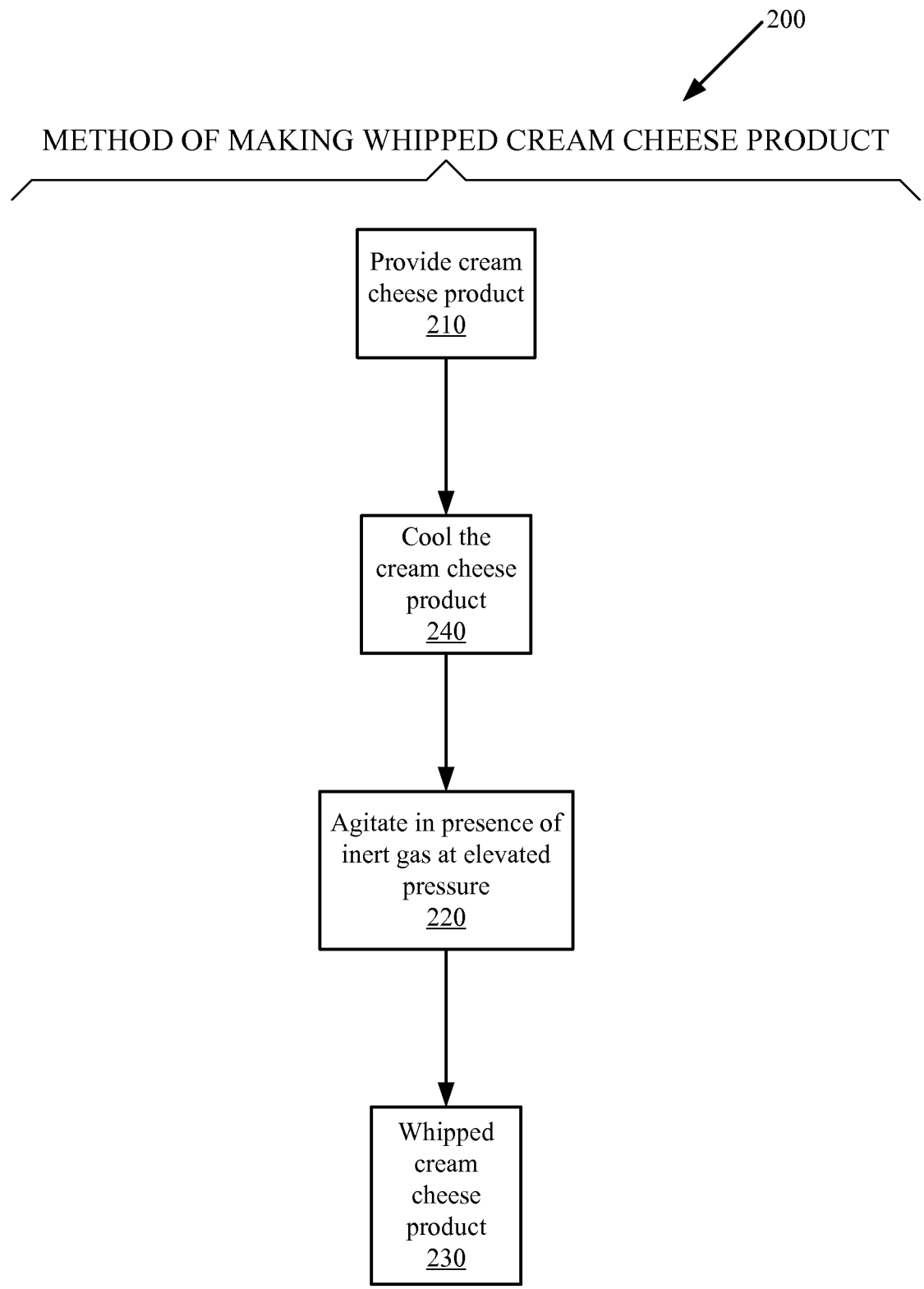
FIG. 2 is a flow chart of an exemplary process for making a whipped cream cheese product according to the present invention.

In yet a further implementation, the consistency of the cream cheese product can be modified to yield a whipped, more easily spreadable product. Referring to FIG. 2, an exemplary process 200 for carrying out a whipping operation is shown. The process begins with providing a cream cheese product at step 210, in accordance with the above teachings. At step 220, the cream cheese product is agitated in the presence of an inert gas at an elevated pressure. For example, the cream cheese product can be passed through a confined space having an agitator, while being simultaneously subjected to an inert gas at an elevated pressure.

In one implementation, the inert gas is provided at an initial pressure within a range of between about 150 PSI and about 240 PSI. In another implementation, the inert gas is provided at an initial pressure within a range of between about 220 PSI and about 240 PSI. In yet a further implementation, the pressure of the inert gas is controlled throughout the agitator in order to expose the cream cheese product to a desired pressure for a defined time as it travels through the agitator. In another implementation, the inert gas is injected into the agitator at a chosen initial pressure, which is then permitted to dissipate in the region of the agitator. In one implementation, the cream cheese product is exposed to a desired pressure for between about 3 seconds and about 6 seconds. In an additional implementation, the cream cheese product is exposed to a desired pressure for between about 4 seconds and about 5 seconds. Although any inert gas can be used, nitrogen is the typical and most practical choice. By "inert" is meant a gas that does not cause or at least minimizes undesirable effects on the cream cheese product, its production, and the consumer.

Injection of a gas into the cream cheese product under high pressure is problematic due to the extreme density mismatch of the gas and the cream cheese product. The gas diffuses into the cream cheese product. Diffusion of the gas throughout the body of cream cheese product is not instantaneous even with agitation, effectively requiring a gas delivery pressure above and beyond that necessary for equalizing the prevailing pressure within the body of cream cheese product. This resistance to gas dispersion in the semi-solid cream cheese product can be ameliorated by employing an in-line gas injection system providing controllable gas injection pressure and desirably having a relatively large bore gas delivery orifice. A mass flow controller such as, for example, a GFC-171S mass flow controller commercially available from Aalborg Instruments & Controls, Inc., 20 Corporate Drive, Orangeburg, N.Y. 10962, can be used.

In one implementation, the temperature of the cream cheese product is reduced at step 240, and so maintained or further modified during step 220. For example, a scraped surface heat exchanger, such as a Waukesha Cherry-Burrell Thermutator® or Votator®, can be used to provide the needed agitation while simultaneously controlling the temperature. In one implementation, the temperature of the cream cheese product is reduced to a suitable inert gas injection temperature at step 240, and is then so maintained or further reduced during step 220. This temperature reduction at step 240 increases retention of the inert gas in the cream cheese product during subsequent step 220. In the absence of such a temperature reduction before injection of the inert gas, excessive escape of the inert gas from the cream cheese product prior to or during step 220 may retard the desired whipping process and result in a product having a less whipped texture than desired. In one implementation, the cream cheese product is cooled at step 240 to an inert gas injection temperature within a range of between about 65° F. and about 68° F., and agitation in the presence of the inert gas at an elevated pressure is then carried out at a temperature within a range of between about 58° F. and about 62° F. within the agitator at step 220. Using higher temperatures counteracts the effect of the pressurized gas in causing the cream cheese product to expand into whipped form and accordingly is to be avoided. If desired, however, the cream cheese product may in general be cooled to a whipping temperature within a range of between about 65° F. and about 90° F., and more desirably cooled at least to about 80° F., at step 240. A temperature within a range of between about 58° F. and about 70° F., more desirably about 68° F. or lower, may then be employed within the agitator at step 220. Either or both of steps 240 and 220 can include multiple cooling steps that reduce the cream cheese product temperature in a staged, controlled manner. This cooling can be carried out, for example, with a smooth and gradual temperature reduction or in discrete steps. In one implementation, step 240 is carried out immediately following completion of acidification in step 150.

The agitation within the scraped surface heat exchanger may be controlled to a desired level in order to maintain the cream cheese product within the exchanger for an adequate time for the pressurized inert gas to act on the product. The normal operating speed of the agitator in a Waukesha Cherry-Burrell Thermutator® or Votator® may need to be reduced, for example to within a range of between about 800 and 1,000 revolutions per minute, in order to avoid excessive shear. In order to facilitate further reduction of the temperature of the cream cheese product in the course of passage through the scraped surface heat exchanger, such exchanger is equipped to withdraw heat from the product, which is then dissipated in a suitable manner. In one implementation, two scraped surface heat exchangers are operated in series so that the cream cheese product is successively passed through both exchangers, which jointly cool and apply pressurized inert gas to the cream cheese product. In another implementation, a Terlotherm® vertical scraped surface heat exchanger is employed. Terlotherm® machinery is commercially available from Terlet USA, 6981 North Park Drive, East Bldg., Suite 201, Pennsauken, N.J. 08109.

The resulting product indicated at 230 is a whipped cream cheese product. The texture and consistency of the cream cheese product is the same as that of ordinary whipped cream cheese. In one implementation, the whipped cream cheese product may have a viscosity within a range of between about 500,000 centipoises and about 1,500,000 centipoises at a temperature of about 74° F.

Where it is desired to add solid adjuvants such as fruits, vegetables or nuts to the cream cheese product, they are desirably added after the whipping process is completed.

EXAMPLE 1

A batch of 1,500 pounds of heavy cream having a butterfat content of 44% is pumped into a kettle equipped with a heater and an agitator. The butterfat content of the cream is then adjusted to 33% by weight by the addition with agitation of 195.8 pounds of nonfat dry milk and 180 pounds of water. After 15 minutes of agitation, 9.01 pounds of K6B493 stabilizer is added to the cream with agitation to thicken the mixture. The mixture is then pasteurized by heating it to a temperature of about 165° F. and maintaining that temperature for about 15 minutes. The mixture is then homogenized by subjecting the mixture to a pressure of about 3,000 PSI for about 5 seconds. The mixture is then cooled with agitation to 85° F., whereupon 500 milligrams of pHage Control™ 604 cream cheese culture bacteria are added to the cream with agitation for 15 minutes. The mixture is then maintained at 85° F. for about 14 hours until a pH of about 4.5 is reached. The mixture is then acidified to a pH of about 4.4 by addition of about 8 pounds of lactic acid. Sodium chloride in an amount of 11.4 pounds is added.

The resulting cream cheese product comprises about 33% by weight of butterfat; about 3.6% of protein; about 0.0813% by weight of cholesterol; and about 0.569% by weight of sodium. The cream cheese product comprises about 53% by weight of water and about 47% by weight of solids. The cream cheese product has a viscosity of about 1,336,000 centipoises at a temperature of about 74° F.

EXAMPLE 2

A batch of 1,335 pounds of heavy cream having a butterfat content of 44% is pumped into a kettle equipped with a heater and an agitator. The butterfat content of the cream is then adjusted to 23.5% by weight by the addition with agitation of 244 pounds of nonfat dry milk and 765 pounds of water. After 15 minutes of agitation, 11.25 pounds of K6B493 stabilizer is added to the cream with agitation to thicken the mixture. The mixture is then pasteurized by heating it to a temperature of about 165° F. and maintaining that temperature for about 15 minutes. The mixture is then homogenized by subjecting the mixture to a pressure of about 3,000 PSI for about 5 seconds. The mixture is cooled with agitation to 85° F., whereupon 500 milligrams of pHage Control™ 604 cream cheese culture bacteria are added to the cream with agitation for 15 minutes. The mixture is then maintained at 85° F. about 14 hours until a pH of about 4.5 is reached. The mixture is then acidified to a pH of about 4.4 by addition of about 8 pounds of lactic acid. Sodium chloride in an amount of 13.68 pounds is added to the product.

The resulting light cream cheese product comprises about 24% by weight of butterfat; about 3.6% by weight of milk protein; about 0.0613% by weight of cholesterol; and about 0.569% by weight of sodium. The cream cheese product comprises about 62% by weight of water and about 38% by weight of solids. The cream cheese product has a viscosity of about 1,500,000 centipoises at a temperature of about 74° F. The cream cheese product yields less than about 1% syneresis by weight after 15 hours at about 74° F. to about 75° F.

While the present invention has been disclosed in a presently preferred context, it will be recognized that the present teachings may be adapted to a variety of contexts consistent with this disclosure and the claims that follow. For example, the process shown in the figures and discussed above can be adapted in the spirit of the many optional parameters described, to yield a variety of cream cheese products.

What is claimed is:

1. A composition, comprising:
   a cream cheese product including a milkfat fluid, mesophilic bacteria, and live and active thermophilic lactic acid-producing probiotic bacteria;
   wherein the composition has an acidic pH within a range of between about 5.0 and about 4.1.

2. The composition of claim 1, having less than about 1% syneresis by weight after 15 hours at a temperature within a range of between about 74° F. an about 75° F.

3. The composition of claim 1, including a stabilizer.

4. The composition of claim 1, including a non-digestible oligosaccharide or a digestion-resistant polysaccharide.

5. The composition of claim 1, wherein the mesophilic bacteria include mesophilic bacteria being of a strain that includes *Lactococcus lactis lactis, Lactococcus lactis cremoris, Lactococcus lactis diacetylactis*, or *Leuconostoc*.

6. The composition of claim 1, wherein the live and active thermophilic lactic acid-producing probiotic bacteria include bacteria being of a strain that includes *Lactobacillus delbrueckii* subspecies *bulgaricus, Streptococcus thermophilus, Lactobacillus acidophilus, Bifidobacterium*, or *Lactobacillus paracasei* subspecies *casei*.

7. The composition of claim 1, wherein the milkfat fluid includes whole milk, cream, skim milk, or reconstituted dry milk.

8. The composition of claim 1, wherein the acidic pH is within another range of between about 4.6 and about 4.4.

9. The composition of claim 1, wherein the acidic pH is within another range of between about 4.38 and about 4.50.

10. The composition of claim 1, including inulin, lactulose, or lactitol.

11. The composition of claim 1, wherein the cream cheese product includes butterfat, and wherein the composition includes by weight about 10% to about 55% butterfat.

12. The composition of claim 11, wherein the cream cheese product includes milk protein, and wherein the composition includes by weight about 2% to about 10% milk protein.

* * * * *